(12) United States Patent
Kuboyama et al.

(10) Patent No.: US 10,138,848 B2
(45) Date of Patent: Nov. 27, 2018

(54) CANISTER

(71) Applicant: FUTABA INDUSTRIAL CO., LTD., Okazaki-shi, Aichi (JP)

(72) Inventors: Keisuke Kuboyama, Okazaki (JP); Shogo Minezawa, Okazaki (JP)

(73) Assignee: FUTABA INDUSTRIAL CO., LTD., Okazaki-Shi, Aichi (JP)

( * ) Notice: Subject to any disclaimer, the term of this patent is extended or adjusted under 35 U.S.C. 154(b) by 84 days.

(21) Appl. No.: 15/113,635

(22) PCT Filed: Jan. 20, 2015

(86) PCT No.: PCT/JP2015/051392
§ 371 (c)(1),
(2) Date: Jul. 22, 2016

(87) PCT Pub. No.: WO2015/111575
PCT Pub. Date: Jul. 30, 2015

(65) Prior Publication Data
US 2017/0009707 A1  Jan. 12, 2017

(30) Foreign Application Priority Data

Jan. 23, 2014  (JP) ................. 2014-010367

(51) Int. Cl.
*F02M 25/08* (2006.01)
*B01D 53/04* (2006.01)
*B60K 15/035* (2006.01)

(52) U.S. Cl.
CPC ..... *F02M 25/0854* (2013.01); *B01D 53/0407* (2013.01); *B60K 15/03504* (2013.01);
(Continued)

(58) Field of Classification Search
CPC .......... B01D 53/0407; B01D 2253/102; B01D 2253/3425; B01D 2259/4516;
(Continued)

(56) References Cited

U.S. PATENT DOCUMENTS

| 4,386,947 A * | 6/1983 | Mizuno | ................. B01D 53/02 123/519 |
| 6,896,852 B1 * | 5/2005 | Meiller | ............. B01D 53/0415 123/519 |

(Continued)

FOREIGN PATENT DOCUMENTS

| JP | 2004100691 A | 4/2004 |
| JP | 2008038675 A | 2/2008 |

(Continued)

OTHER PUBLICATIONS

International Preliminary Report on Patentability (Chapter II of the Patent Cooperation Treaty) (Form PCT/IPEA/409) for International Patent Application No. PCT/JP2015/051392 dated Apr. 22, 2016, 6 pages.

(Continued)

*Primary Examiner* — Frank M Lawrence, Jr.
(74) *Attorney, Agent, or Firm* — Withrow & Terranova, P.L.L.C.; Vincent K. Gustafson

(57) ABSTRACT

A canister in one aspect of the present invention comprises an adsorber having a honeycomb shape that adsorbs evaporated fuel and a housing chamber that houses the adsorber. The canister comprises an outer passage, provided in the housing chamber, that passes over an outer surface of the adsorber and a flow passage that passes through the adsorber and the outer passage as a flow passage for the evaporated fuel to pass through the housing chamber.

4 Claims, 3 Drawing Sheets

(52) U.S. Cl.
CPC ............ *B01D 2253/102* (2013.01); *B01D 2253/3425* (2013.01); *B01D 2259/4516* (2013.01); *B60K 2015/03576* (2013.01)

(58) Field of Classification Search
CPC .......... F02M 25/0854; B60K 15/03504; B60K 2015/03576
USPC ........... 96/108, 121, 131, 132, 147; 123/519
See application file for complete search history.

(56) References Cited

U.S. PATENT DOCUMENTS

| | | | | |
|---|---|---|---|---|
| 7,134,426 | B2 * | 11/2006 | Uchino | F02M 25/0854 123/518 |
| 2005/0172938 | A1 | 8/2005 | Uchino et al. | |
| 2006/0065252 | A1 * | 3/2006 | Meiller | F02M 25/0854 123/519 |
| 2008/0184973 | A1 * | 8/2008 | Yamazaki | B01D 53/0415 123/519 |
| 2009/0223370 | A1 * | 9/2009 | Kosugi | B01D 53/0407 96/126 |
| 2010/0095938 | A1 * | 4/2010 | Kosugi | B60K 15/03504 123/519 |
| 2011/0315126 | A1 | 12/2011 | Yoshida et al. | |
| 2013/0291839 | A1 * | 11/2013 | Lin | F02M 33/02 123/519 |

FOREIGN PATENT DOCUMENTS

| | | |
|---|---|---|
| JP | 2010144549 A | 7/2010 |
| JP | 2012007501 A | 1/2012 |

OTHER PUBLICATIONS

International Search Report (Form PCT/ISA/210), Written Opinion (Form PCT/ISA/237), and Notification of Transmittal of the International Search Report and the Written Opinion of the International Searching Authority (Form PCT/ISA/220) for International Patent Application No. PCT/JP2015/051392 dated Apr. 21, 2015, 8 pages.
Translation of International Search Report (Form PCT/ISA/210) for International Patent Application No. PCT/JP2015/051392 dated Apr. 21, 2015, 2 pages.
Partial Machine Translation of Written Opinion (Form PCT/ISA/237) for International Patent Application No. PCT/JP2015/051392 dated Apr. 21, 2015, 2 pages.
Notification of Transmittal of Translation of IPRP, and Translation of International Preliminary Report on Patentability (Chapter II of the Patent Cooperation Treaty) (Forms PCT/IB/338 and PCT/IPEA/409) for International Application No. PCT/JP2015/051392 dated Jul. 28, 2016 (5 pages).
Notice of Reason(s) for Rejection for Japanese Patent Application No. 2014-010367 dated Oct. 17, 2017 (5 pages including English language translation).

* cited by examiner

CANISTER

CROSS-REFERENCE TO RELATED APPLICATIONS

This international application claims the benefit of Japanese Patent Application No. 2014-10367 filed Jan. 23, 2014 in the Japan Patent Office, and the entire disclosure of Japanese Patent Application No. 2014-10367 is incorporated herein by reference.

TECHNICAL FIELD

The present invention relates to a canister, and more particularly to a structure to improve efficiency of honeycomb carbon.

BACKGROUND ART

As shown in FIG. 3, a canister 100 includes a first chamber 110 that is provided with a charge port 111 and a purge port 112, a second chamber 120 that communicates with the first chamber 110, and a third chamber 130 that communicates with the second chamber 120. Among these, the first chamber 110 and the second chamber 120 are filled with an adsorbent 114 and an adsorbent 121, respectively, that are each made of an aggregate of granular activated carbon. The third chamber 130 is filled with an adsorber 131 that is made of carbon body and is formed in a honeycomb shape.

The canister 100 is provided between a gas tank and an external space in order to inhibit evaporated fuel generated in the gas tank from being directly emitted into the atmosphere. When evaporated fuel is generated in the gas tank, the canister 100 passes the evaporated fuel along with air through the charge port 111, the first chamber 110, the second chamber 120, and the third chamber 130 to thereby make the evaporated fuel adsorbed by the adsorbent 114, the adsorbent 121, and the adsorber 131, and then emits the air having a reduced concentration of the evaporated fuel into the atmosphere.

SUMMARY OF THE INVENTION

Problems to be Solved by the Invention

Although the evaporated fuel is mostly adsorbed when passing through the second chamber 120, a further improvement in adsorption efficiency of evaporated fuel is desired due to the tightening of regulations. To comply with the regulations, the third chamber 130 may be filled with an adsorbent in the same manner as the first chamber 110 and the second chamber 120. However, the third chamber 130 filled with an adsorbent leads to an excessive pressure loss. This results in various problems, such as stop of an operation of a refueling gun (stop of refueling), in a case of processing the evaporated fuel generated during refueling by the canister 100 having a high pressure loss.

Thus, an adsorber 131 formed in a honeycomb shape is provided in the third chamber 130, in order to achieve an improved adsorption efficiency of evaporated fuel while inhibiting increase in pressure loss. However, it is required to increase the length of the adsorber 131 in order to trap more evaporated fuel generated from a fuel tank while a vehicle is stopped.

In one aspect of the present invention, it is desirable to provide a canister that achieves an improved adsorption efficiency of evaporated fuel without increasing the length of the adsorber.

Means for Solving the Problems

As in a first aspect of the present invention, a canister comprises an adsorber having a honeycomb shape that adsorbs evaporated fuel, and a housing chamber that houses the adsorber. The canister comprises an outer passage, provided in the housing chamber, that passes over an outer surface of the adsorber and a flow passage that passes through the adsorber and the outer passage as a flow passage for the evaporated fuel to pass through the housing chamber.

According to such a configuration, the evaporated fuel is trapped twice, i.e., both inside and outside the adsorber, when the evaporated fuel passes through the flow passage in the housing chamber (the third chamber).

Thus, this enables an improvement in adsorption efficiency of evaporated fuel without lengthening the adsorber as compared with the canister described in the background art section.

As in a second aspect of the present invention, the outer passage in the canister may comprise a narrowing portion in which a flow passage area gradually decreases from upstream toward downstream of a flow of the evaporated fuel.

According to such a configuration, when the evaporated fuel passes through the narrowing portion of the outer the passage, the evaporated fuel has more opportunity to contact the outer surface of the adsorber due to the decrease in the flow passage area.

Thus, use of this canister enables a further improvement in adsorption efficiency of evaporated fuel.

As in a third aspect of the present invention, the canister that comprises a first chamber that houses an adsorbent, a second chamber that houses an adsorbent, a third chamber as the aforementioned housing chamber may comprise a flow passage that passes through housing spaces where the adsorbents are housed in the first chamber and the second chamber, and through the adsorber and the outer passage in the third chamber.

This configuration enables also the aforementioned canister that comprises the first chamber to the third chamber to achieve an improved adsorption efficiency of evaporated fuel without lengthening the adsorber.

As in a fourth aspect of the present invention, the canister may employ activated carbon as the adsorbent.

As in a fifth aspect of the present invention, the adsorber may comprise a carbon material.

EXPLANATION OF REFERENCE NUMERALS

1 . . . canister, 1a . . . casing, 1b . . . partition wall, 1c . . . partition wall, 1d . . . bottom cap, 1e . . . vent cap, 5 . .

. honeycomb carbon, 10 . . . first chamber, 11 . . . charge port, 12 . . . purge port, 13 . . . filter, 14 . . . adsorbent, 15 . . . filter, 16 . . . grid, 17 . . . spring, 20 . . . second chamber, 21 . . . auxiliary chamber, 22 . . . communicating wall, 23 . . . filter, 24 . . . adsorbent, 25 . . . filter, 26 . . . grid, 27 . . . spring, 30 . . . third chamber, 31 . . . narrowing portion, 32 . . . honeycomb seal guide, 33 . . . air port, 34 . . . rib, 35 . . . filter, 36 . . . outer passage, 51 . . . seal rubber, 52 . . . filter.

MODE FOR CARRYING OUT THE INVENTION

Hereinafter, an embodiment of the present invention will be described with reference to the drawings.

Figure 1:
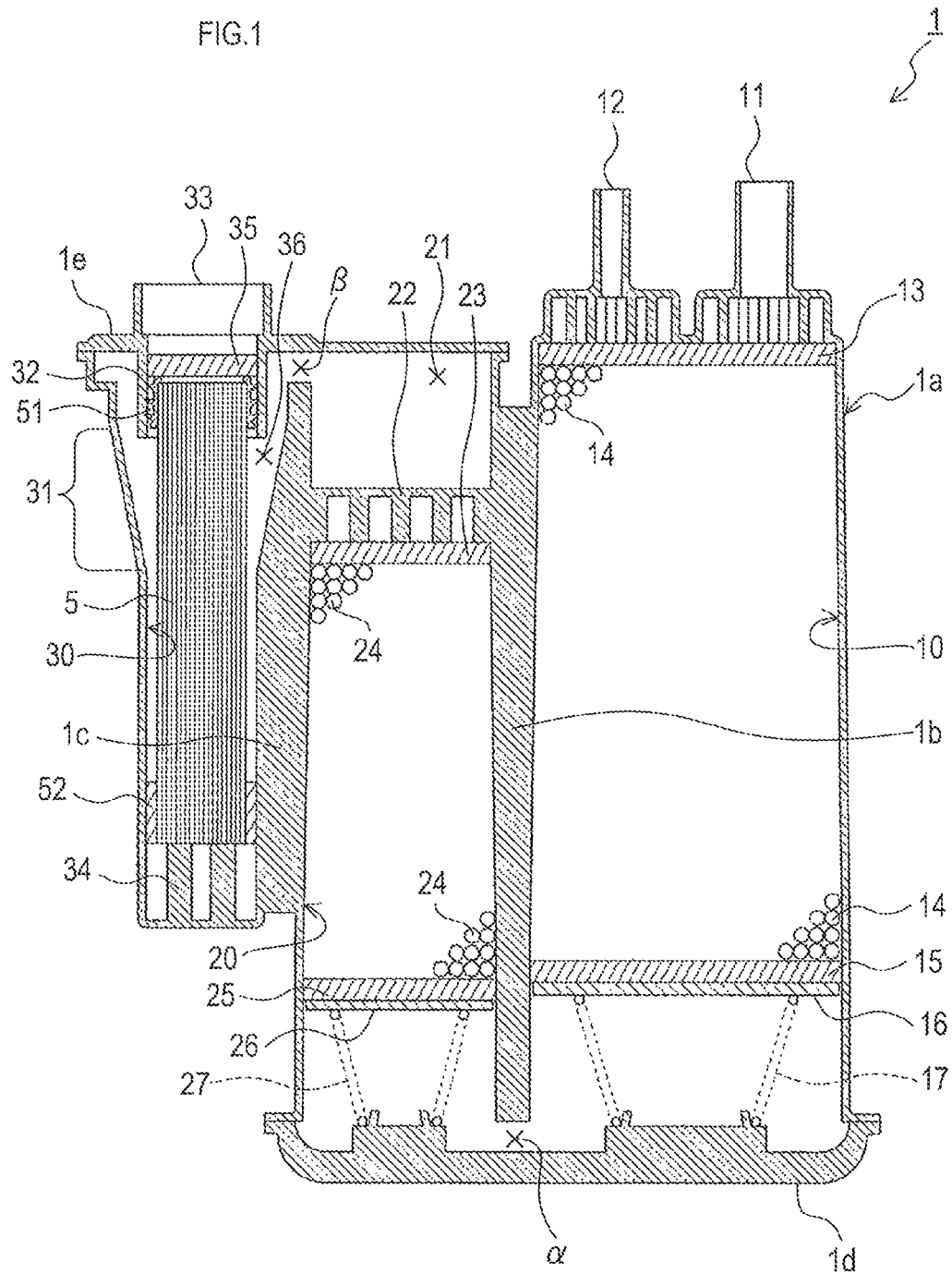
FIG. 1 is a view showing an inside structure of a canister according to a present embodiment.
Figure 2A:
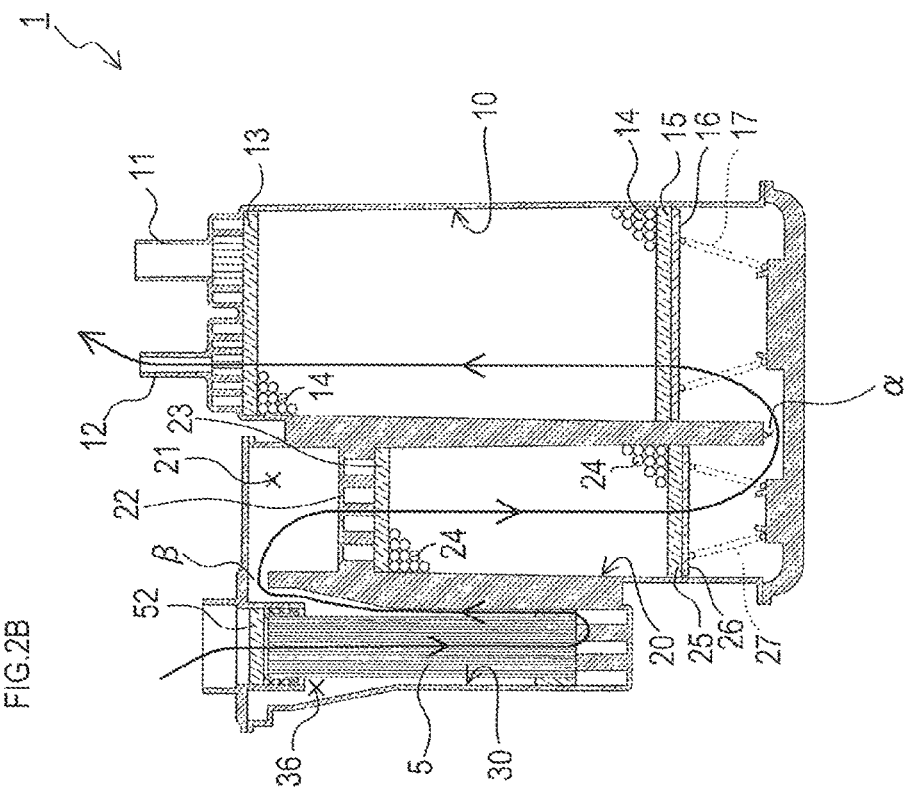
FIG. 2A is an explanatory view illustrating a passing route during adsorption of evaporated fuel flowing through the canister according to the present embodiment.
Figure 2B:
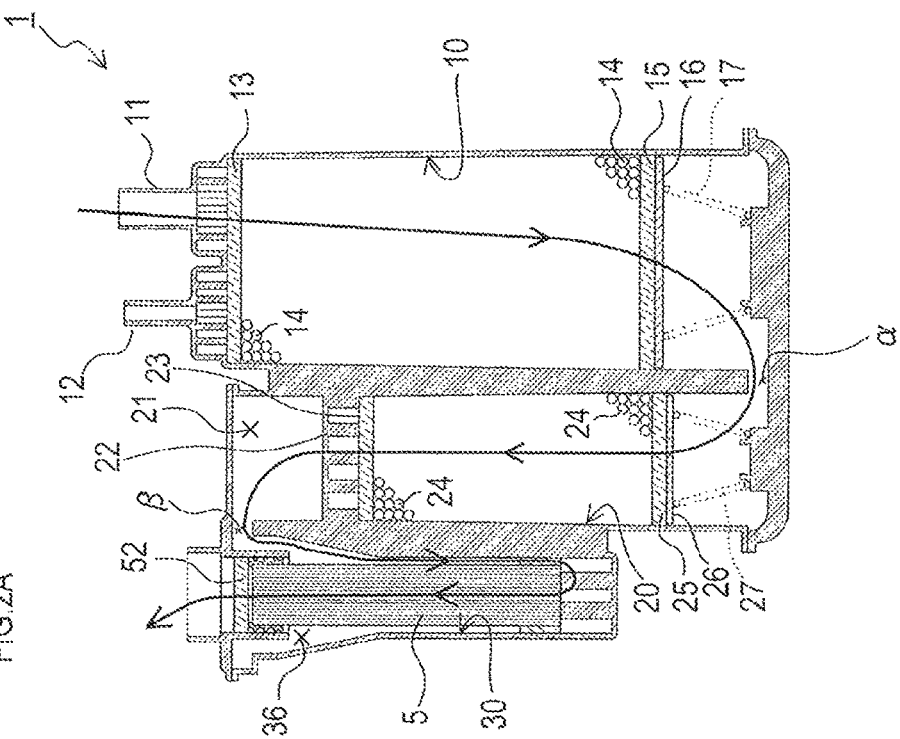
FIG. 2B is an explanatory view of desorption illustrating a passing route during desorption of evaporated fuel flowing through the canister according to the present embodiment.
Figure 3:
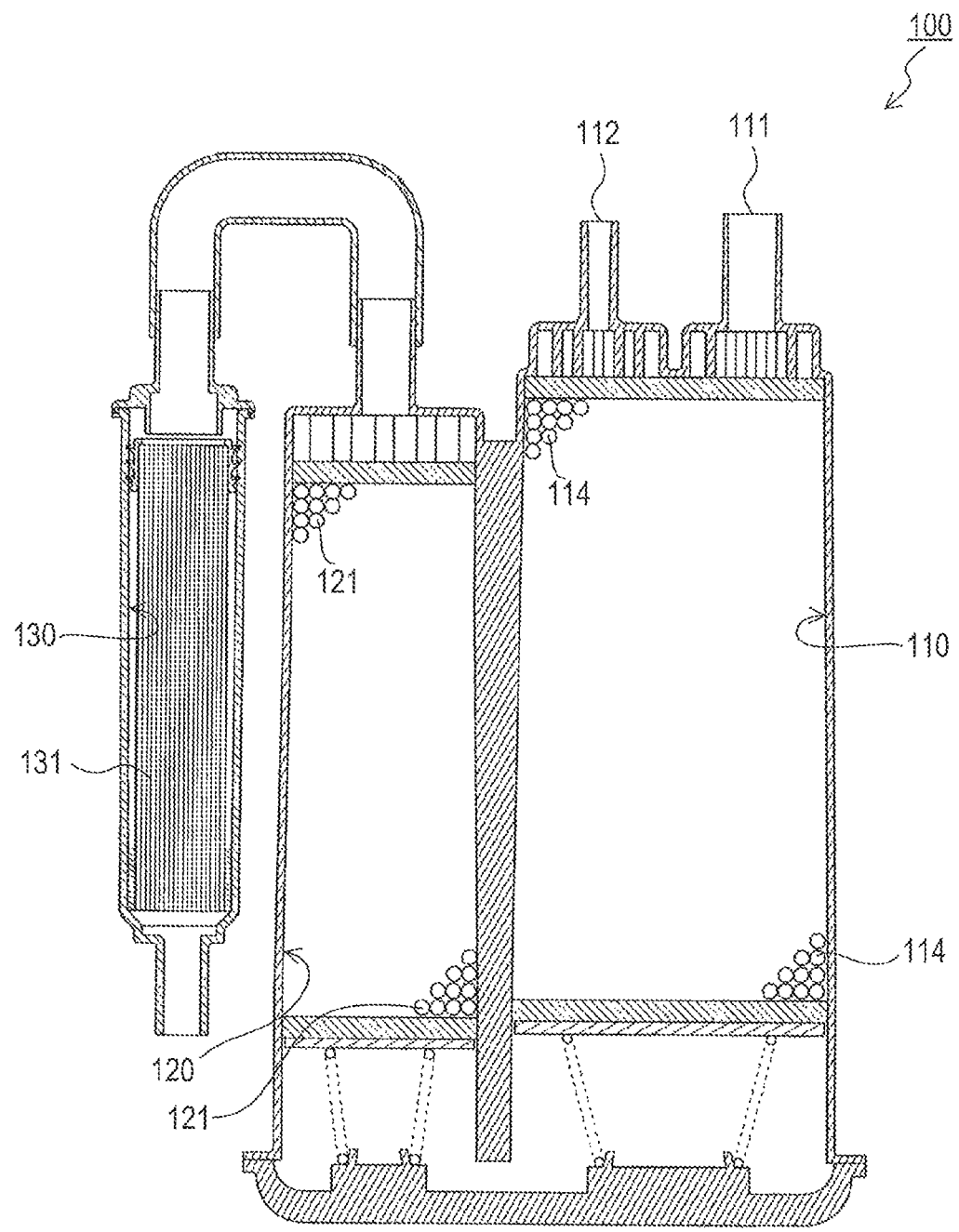
FIG. 3 is a view showing an inside structure of a canister described in the background art.

In the description below, an upper side, on a paper surface, of a canister 1 shown in each of FIG. 1, FIG. 2A, and FIG. 2B is simply referred to as the upper side, whereas a lower side, on the paper surface, is simply referred to as the lower side.

As shown in FIG. 1, the canister 1 of the present embodiment comprises mainly a casing 1a that is partitioned into three spaces forming a first chamber 10 to a third chamber 30. Among these, the first chamber 10 and a second chamber 20 are partitioned by a partition wall 1b, whereas the second chamber 20 and the third chamber 30 are partitioned by a partition wall 1c.

The first chamber 10 and the second chamber 20 comprise respective bottom portions having respective openings, which are closed by a bottom cap 1d. Specifically, these openings are closed by the bottom cap 1d such that a communication hole α communicating the first chamber 10 with the second chamber 20 is provided between a lower end of the partition wall 1b and the bottom cap 1d.

The canister 1 of the present embodiment also comprises an auxiliary chamber 21 at the upper side of the second chamber 20. The auxiliary chamber 21 and the third chamber 30 comprises respective ceiling portions having respective openings, which are closed by a vent cap 1e. Specifically, these openings are closed by the vent cap 1e such that a communication hole β communicating the auxiliary chamber 21 with the third chamber 30 is formed between an upper end of the partition wall 1c and the vent cap 1e.

A part of the casing 1a that forms the first chamber 10 comprises a ceiling portion from an upper surface of which a charge port 11 and a purge port 12 are provided toward the upper side. The charge port 11 and the purge port 12 are disposed along an arrangement direction of the first chamber 10 to the third chamber 30, and communicate with the first chamber 10.

The charge port 11 is coupled to a fuel tank, and the purge port 12 is coupled to an inlet pipe of an internal combustion engine through a purge valve.

The first chamber 10 houses therein a filter 13, an adsorbent 14, a filter 15, and a grid 16, which are stacked in this order toward the lower side from a lower surface of a ceiling in the first chamber 10. The adsorbent 14 is an aggregate of granular activated carbon.

Springs 17 are attached on an upper surface of a part of the bottom cap 1d that closes the first chamber 10, and upper ends of the springs 17 contact the grid 16. Thus, when the bottom cap 1d is closed, the grid 16 is pushed toward the upper side by biasing forces of the springs 17.

As a result, the filter 13, the adsorbent 14, and the filter 15 are held between the ceiling portion of the first chamber 10 and the grid 16, and are housed in the first chamber 10.

A part of the casing 1a that forms the second chamber 20 comprises the auxiliary chamber 21 at the upper side of the second chamber 20, and the second chamber 20 and the auxiliary chamber 21 are partitioned by a communicating wall 22. The communicating wall 22 has multiple holes to enable communication between the second chamber 20 and the auxiliary chamber 21.

The second chamber 20 houses therein a filter 23, an adsorbent 24, a filter 25, and a grid 26, which are stacked in this order toward the lower side from a lower surface of the communicating wall 22. The adsorbent 24 is an aggregate of granular activated carbon.

Springs 27 are attached on an upper surface of a part of the bottom cap 1d that closes the second chamber 20, and upper ends of the springs 27 contact the grid 26. Thus, when the bottom cap 1d is closed, the grid 26 is pushed toward the upper side by biasing forces of the springs 27.

As a result, the filter 23, the adsorbent 24, and the filter 25 are held between the communicating wall 22 and the grid 26, and are housed in the second chamber 20.

A part of the casing 1a that forms the third chamber 30 has a shape shorter in an upper and lower direction than the parts of the casing 1a that form the first chamber 10 and the second chamber 20.

The casing 1a, however, is configured such that an upper end of the auxiliary chamber 21 and an upper end of the third chamber 30 are located at the same height position so as to enable simultaneous closing of a ceiling portion of the auxiliary chamber 21 and a ceiling portion of the third chamber 30 by the vent cap 1e.

The third chamber 30, which is configured in a substantially cylindrical shape, comprises at an upper end side thereof a narrowing portion 31 in which a chamber inner diameter (i.e., a diameter of a cross section when the third chamber 30 is cut by a plane perpendicular to the upper and lower direction) is gradually reduced from the upper side toward the lower side.

A part of the vent cap 1e that closes the ceiling portion of the third chamber 30 comprises a lower surface, from which a honeycomb seal guide 32 having a cylindrical shape is provided toward the lower side, and an upper surface, from which an air port 33 is provided toward the upper side.

The third chamber 30 comprises a bottom portion provided with standing ribs 34. The ribs 34 are configured with a plurality of protrusions extending from the bottom portion configuring the third chamber 30.

A honeycomb carbon 5 having a honeycomb shape is provided in the third chamber 30. The honeycomb carbon 5 that comprises carbon and ceramic is formed by extrusion molding.

The honeycomb carbon 5 has, at one end, an external surface on which a cylindrically shaped seal rubber 51 with an outwardly pleated portion is mounted. The honeycomb carbon 5 also has, at the other end, an external surface on which a cylindrically shaped filter 52 is mounted. The filter 52, which is made of urethane in the present embodiment, may be made of any material having permeability and cushioning properties.

By inserting a part of the honeycomb carbon 5 to which the seal rubber 51 is attached into the honeycomb seal guide 32 after inserting a filter 35 into the honeycomb seal guide 32, the honeycomb carbon 5 is attached to the vent cap 1e. At this time, the honeycomb carbon 5 is secured to the vent cap 1e by the pleated portion of the seal rubber 51 stretching between the honeycomb seal guide 32 and the honeycomb carbon 5.

When the honeycomb carbon 5 is attached to the vent cap 1e as described above, and the vent cap 1e is attached to the casing 1a to close the openings of the ceiling portions of the auxiliary chamber 21 and the third chamber 30, the honeycomb carbon 5 is inserted into the third chamber 30 and is arranged in the third chamber 30 such that a lower end of the honeycomb carbon 5 contacts the ribs 34.

When the honeycomb carbon 5 having a cylindrical shape is arranged in the third chamber 30 as described above, an outer passage 36 is formed in the third chamber 30. The outer passage 36 communicates with the auxiliary chamber 21, passes over an outer surface of the honeycomb carbon 5, and reaches a space where the ribs 34 are provided. In a region where the narrowing portion 31 is provided, the outer passage 36 is a passage with a gradually decreasing flow passage area from upstream toward downstream of a flow of evaporated fuel.

Since the pleated portion of the seal rubber 51 stretches between the honeycomb seal guide 32 and the honeycomb carbon 5 to thereby fill up an extra space with an inner surface of the honeycomb seal guide 32, it is possible to inhibit escape of evaporated fuel from the outer passage 36 to the air port 33 through the honeycomb seal guide 32.

A description will next be given of an operation of the aforementioned canister 1 of the present embodiment.

In a state where a car is stopped with the internal combustion engine not operated, evaporated fuel generated in the fuel tank or the like is introduced with air into the first chamber 10 through the charge port 11 and passing through the filter 13, and is adsorbed by the adsorbent 14 housed in the first chamber 10, as shown in FIG. 2A.

Evaporated fuel that is not adsorbed by the adsorbent 14 in the first chamber 10 is introduced with air into the second chamber 20 passing through the filter 15, the communication hole α and the filter 25, and is adsorbed by the adsorbent 24 housed in the second chamber 20.

Further, evaporated fuel that is not adsorbed in the second chamber 20 is introduced with air into the third chamber 30 through the filter 23, the communicating wall 22, and the auxiliary chamber 21. When the evaporated fuel is introduced into the third chamber 30, the evaporated fuel along with air passes through the outer passage 36 and is adsorbed to the outer surface of the honeycomb carbon 5 having a cylindrical shape during the passing. Further, the evaporated fuel along with air makes a turn in the space where the ribs 34 are provided, passes through the honeycomb carbon 5, and is adsorbed to an inner surface of the honeycomb carbon 5 having a cylindrical shape during the passing.

Then, the air with a reduced content of the evaporated fuel is emitted from the air port 33 into the atmosphere through the filter 35.

In a region where the ribs 34 are provided, the evaporated fuel passes through among the protrusions forming the rib 34.

During operation of the internal combustion engine, air in the atmosphere is introduced into the honeycomb carbon 5 from the air port 33 through the filter 35, as shown in FIG. 2B. The air introduced into the honeycomb carbon 5 makes fuel desorbed from the inner surface of the honeycomb carbon 5, subsequently passes through the outer passage 36 and further makes fuel desorbed from the outer surface of the honeycomb carbon 5, and then is introduced into the auxiliary chamber 21.

The air containing evaporated fuel is introduced from the auxiliary chamber 21 into the second chamber 20 through the communicating wall 22 and the filter 23, and also makes fuel desorbed from the adsorbent 24 in the second chamber 20.

Further, the air containing evaporated fuel is introduced from the second chamber 20 into the first chamber 10 through the communication hole α and the filter 15. Fuel is also desorbed from the adsorbent 14 in the same manner in the first chamber 10.

Subsequently, the evaporated fuel is discharged to the inlet pipe through the purge port 12 and the purge valve, and is burned in the internal combustion engine.

The canister 1 as described above has characteristic operation and effect as below.

The canister 1 of the present embodiment comprises, in the third chamber 30, a flow passage passing through the honeycomb carbon 5 and through the outer passage 36 as a flow passage for evaporated fuel to pass through the third chamber 30.

Accordingly, in the canister 1, fuel contained in the evaporated fuel is trapped twice, i.e., inside and outside the honeycomb carbon 5, when the evaporated fuel passes through the third chamber 30.

Thus, use of the canister 1 of the present embodiment enables an improvement in adsorption efficiency of evaporated fuel without lengthening the honeycomb carbon 5 as compared with conventional canisters.

In the canister 1 of the present embodiment, the outer passage 36 is provided in the narrowing portion 31 where the flow passage area gradually decreases from upstream toward downstream of the flow of the evaporated fuel.

Accordingly, when the evaporated fuel passes through the narrowing portion 31 of the outer passage 36, the evaporated fuel has more opportunity to contact the outer surface of the honeycomb carbon 5 due to the decrease in the flow passage area.

Thus, the canister 1 of the present embodiment enables a further improvement in adsorption efficiency of evaporated fuel as compared with a case of simply providing the outer passage 36.

(Correspondence)

The honeycomb carbon 5 of the present embodiment is an example of an adsorber in the present invention.

Other Embodiments (1) The canister 1 described in the above embodiment is merely an example and is not limitative.

(2) Although the above embodiment describes the canister 1 in which the first chamber 10 and the second chamber 20 are configured to be integral with the third chamber 30, these chambers may be separately provided.

(3) The narrowing portion 31 described in the above embodiment may have, for example, a tapered cross sectional shape, and also the taper may be straight or curved.

The invention claimed is:
1. A canister comprising:
a first chamber that houses an adsorbent;
a second chamber that houses an adsorbent;
an adsorber having a honeycomb shape that adsorbs evaporated fuel;
a third chamber that houses the adsorber; and
an auxiliary chamber that is located in a flow path that reaches to the third chamber from the second chamber and is partitioned from the second chamber by a communicating wall and from the third chamber by a partition wall;
wherein the canister comprises:
an outer passage, provided in the third chamber, that passes over an outer surface of the adsorber; and a flow passage that sequentially passes through the outer passage and the adsorber as a flow passage for the evaporated fuel to pass through the third chamber; and wherein the outer passage comprises a narrowing portion in which a flow passage area is gradually reduced from upstream toward downstream of a flow of the evaporated fuel.

2. The canister according to claim 1, wherein the canister comprises a flow passage that passes through housing spaces where the adsorbents are housed in the first chamber and the second chamber, and through the adsorber and the outer passage in the third chamber.

3. The canister according to claim 2, wherein the adsorbents are activated carbon.

4. The canister according to claim 1, wherein the adsorber comprises a carbon material.

* * * * *